United States Patent [19]

Shinada et al.

[11] Patent Number: 4,993,013
[45] Date of Patent: Feb. 12, 1991

[54] MONITOR SYSTEM FOR MULTIPLEX EQUIPMENT

[75] Inventors: Shigeo Shinada; Hiroyuki Fujita, both of Yokohama, Japan

[73] Assignee: Hitachi, Ltd., Tokyo, Japan

[21] Appl. No.: 414,599

[22] Filed: Sep. 29, 1989

Related U.S. Application Data

[63] Continuation of Ser. No. 257,890, Oct. 14, 1988, abandoned.

[30] Foreign Application Priority Data

Oct. 16, 1987 [JP] Japan .................. 62-259688

[51] Int. Cl.⁵ .............................. H04J 3/14
[52] U.S. Cl. ....................... 370/13; 370/15; 370/84; 370/112; 371/24; 371/71
[58] Field of Search ............ 370/13, 15, 84, 112, 370/14; 371/24, 71

[56] References Cited

U.S. PATENT DOCUMENTS

| | | | |
|---|---|---|---|
| 3,920,919 | 11/1975 | Aillet | 370/13 |
| 4,345,324 | 8/1982 | Smitt | 370/13 |
| 4,376,998 | 3/1983 | Abbott et al. | 370/13 |
| 4,601,028 | 7/1986 | Huffman et al. | 370/15 |
| 4,730,302 | 3/1988 | Fuerlinger et al. | 370/13 |
| 4,908,818 | 3/1990 | Kawano | 370/15 |

OTHER PUBLICATIONS

"Multiplex Equipment In-Out Check", in the National Conference of the Institute of Electronics and Communication Engineers of Japan (1979), Article No. 2036.

Primary Examiner—Douglas W. Olms
Assistant Examiner—Alpus H. Hsu
Attorney, Agent, or Firm—Antonelli, Terry, Stout & Kraus

[57] ABSTRACT

A monitor system for a multiplex equipment, comprising a multiplexing unit for multiplexing low speed group input signals of plural channels into a high speed group output signal and a demultiplexing unit for demultiplexing a high speed group input signal into low speed group output signals of plural channels, wherein the high speed group output signal and the low speed group input signals on one hand and the high speed group input signal and the low speed group output signals on the other hand are monitored through comparison on the basis of the low speed group signal. When discrepancy is detected in the comparison between the high speed group output signal and the low speed group input signal in a certain channel of the low speed group signal in the course of monitoring the multiplex unit, the comparison between the high speed input signal and the low speed output signal is performed in a different channel of the low speed group signal for monitoring the demultiplex unit. The time taken for making decision of the presence of fault from the detection of discrepancy in the comparison can be reduced, whereby exchange of the equipment suffering from the fault can be accomplished rapidly in response to the fault information, decreasing the shutdown duration involved in restoration.

2 Claims, 5 Drawing Sheets

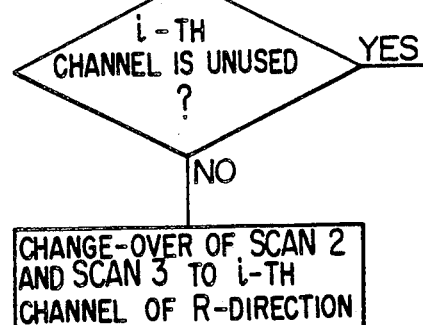

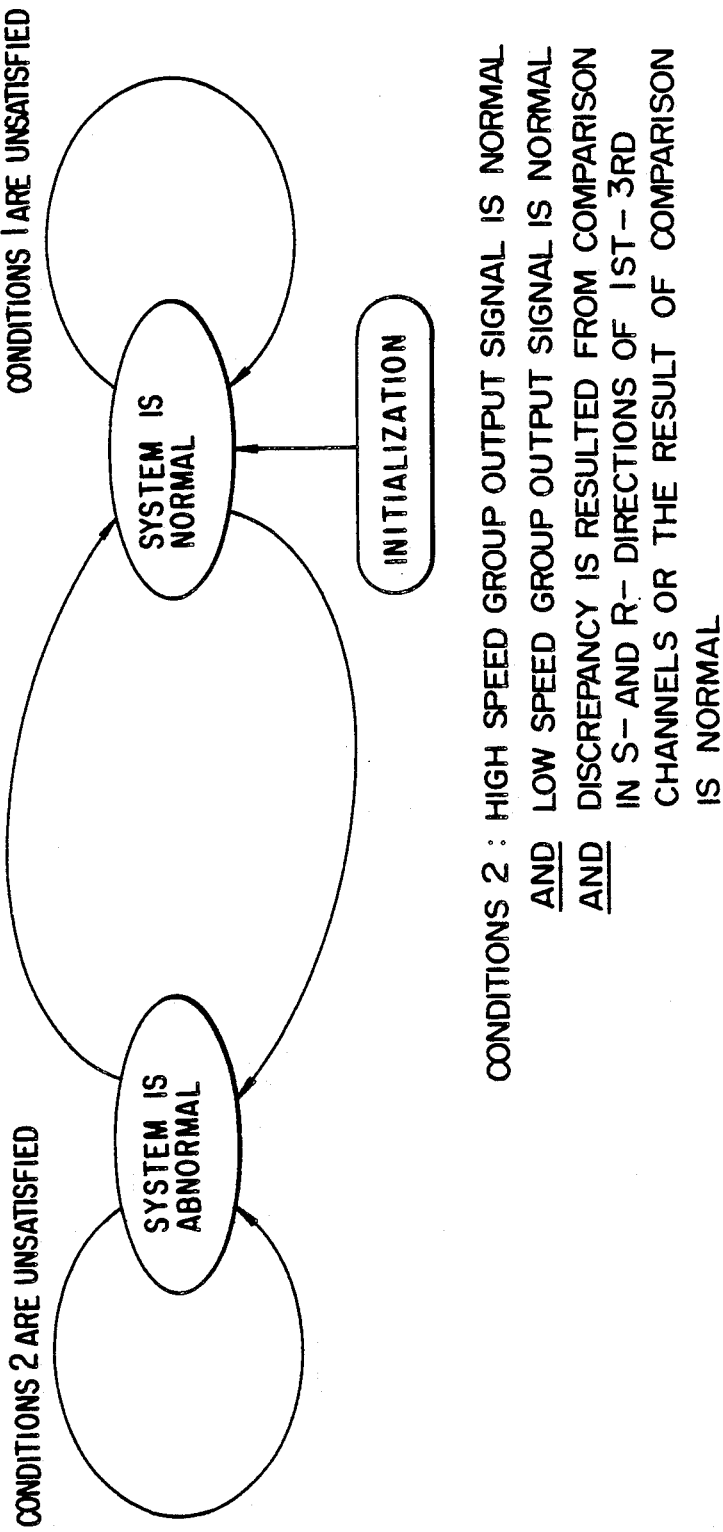

FIG. 6

CONDITIONS 1: HIGH SPEED GROUP OUTPUT SIGNAL IS ABSENT
OR LOW SPEED GROUP OUTPUT SIGNAL IS ABSENT
OR DISCREPANCY IS DETECTED IN S- OR R- DIRECTION OF 1ST - 3RD CHANNELS
AND RESULT OF CURRENT COMPARISON IS NORMAL

CONDITIONS 2: HIGH SPEED GROUP OUTPUT SIGNAL IS NORMAL
AND LOW SPEED GROUP OUTPUT SIGNAL IS NORMAL
AND DISCREPANCY IS RESULTED FROM COMPARISON IN S- AND R- DIRECTIONS OF 1ST - 3RD CHANNELS OR THE RESULT OF COMPARISON IS NORMAL

MONITOR SYSTEM FOR MULTIPLEX EQUIPMENT

This application is a Continuation of application Ser. No. 257,890, filed Oct. 14, 1988 now abandoned.

BACKGROUND OF THE INVENTION

The present invention relates to a method and system for monitoring whether multiplex equipment operates normally or not.

In the monitor system for the multiplex equipment known heretofore, input and output signals of the multiplex equipment are branched to be inputted to a monitor system for detecting the presence or absence of a discrepancy between these signals by checking through comparison, wherein decision is made that the monitor system suffers a fault only when the discrepancy is not detected in all the comparisons performed on the channel basis of the low speed signal group, as is disclosed in an article entitled "Multiplex Equipment IN-OUT CHECK in the national conference (1979) of The Institute of Electronics And Communication Engineers of Japan", Article No. 203.

In the prior art system mentioned above, no consideration is paid to the time taken for making a decision of occurrence of fault or trouble after detection of discrepancy in the comparison, presenting thus a problem that a lot of time is involved for making a decision of the presence of a fault after detection thereof.

More specifically, in the case of the system known heretofore, monitoring of the multiplex unit is performed for each of the channels (i.e. on a channel basis) in the order of channel sequence of the low speed group signal, being followed by the monitoring of the demultiplexing unit on a channel basis in accordance with the channel sequence of the low group signal in a similar manner, whereupon the monitoring of the multiplex unit is again repeated. Such processing sequence is not changed at the time when discrepancy in the comparison is detected for the first time. Further, when comparison for all the channels of the low speed group signal results in discrepancy, the situation may be considered as being ascribable to the fault of the comparator or comparison procedure. Accordingly, the first detection of discrepancy in the comparison is not allowed to deduce the decision that the equipment suffers a fault. In other words, the fault of equipment can not be decided until no discrepancy has been detected in a certain comparison. Thus, a lot of time is required for making decision of the presence of fault from the detection of discrepancy in the comparison. By way of example, let's suppose that in a multiplex equipment for multiplexing and demultiplexing low speed group signals of n channels, a fault occurs in a high speed group processing circuitry of the multiplexing unit and that discrepancy in the comparison is already detected in the comparison for the first channel. In that case, discrepancy will also be detected in the comparison for the second to n-th channels due to the fault in the high speed group signal processing circuitry. Thus, no discrepancy will be detected at length only in the comparison for the first channel in the monitoring of the demultiplexing unit. In other words, the fault of equipment is allowed to be decided only at this time point.

SUMMARY OF THE INVENTION

An object of the present invention is to provide a monitor system for a multiplex equipment which is so designed as to reduce the time taken for making decision of the fault of the multiplex equipment after detection of discrepancy in comparison.

In view of the above object, it is taught by present invention that when discrepancy is detected for the first time in one channel in the comparison performed on the basis of channel of the low speed group signal between the high speed group output signal and the low speed group input signal in the course of monitoring the multiplexing unit, comparison is then performed in another channel of the low speed group signal differing from the abovementioned one channel between the high speed group input signal and the low speed group output signal in the course of monitoring the multiplex unit, being then followed by the comparisons in the ordinary sequence, wherein decision is made such that the aforementioned discrepancy is due to the fault in the equipment at the time point when discrepancy can be no more detected in the result of the comparison. On the other hand, when discrepancy is detected for the first time in the comparison between the high speed group input signal and the low speed group output signal in the course of monitoring the demultiplexing unit, then comparison is performed on the basis of channel of the low speed group input signal between the high speed group output signal and the low speed group input signal in another channel differing from the channel in which the discrepancy was detected in the course of monitoring the demultiplexing unit, which is then followed by the comparisons in the ordinary sequence, wherein decision is made that the discrepancy is due to fault of the equipment at the time point when no discrepancy is detected in the result of the comparison.

BRIEF DESCRIPTION OF THE DRAWINGS

FIG. 4 is a flow chart showing a processing procedure for checking the high speed group input signal at a corresponding status level shown in FIG. 1;

FIG. 5 is a flow chart showing a processing procedure for checking the i-th channel in R-direction at a corresponding status level;

FIG. 6 is a status transition diagram showing the conditions referred to for the decision of fault in the processing shown in FIGS. 2 to 5.

DESCRIPTION OF THE PREFERRED EMBODIMENTS

The multiplex equipment is composed of a multiplexing unit and a demultiplexing unit which are functionally completely separated from each other. Accordingly, the probability of simultaneous occurrence of a fault in both of the multiplexing and demultiplexing units is extremely low. Further, since the low speed group signal processing circuits of these units are also functionally completely separated from each other for every different channel, the probability of simultaneous occurrence of a fault in the low speed group signal processing circuits for the different channels is very low as well. Accordingly, by monitoring the multiplexing and demultiplexing units in such a manner that, when a discrepancy is detected in the comparison between the high speed group output signal and the low speed group input signal at one channel of the low speed group signal in the monitoring of the multiplexing unit, then comparison between the high speed group input signal and the low speed group output signal is performed in another channel of the low speed group signal which differs from the abovementioned one channel in conjunction with the monitoring of the demultiplexing unit. The probability of the discrepancy in comparison being again detected is extremely low, which in turn means that the probability with which the decision of occurrence of a fault can be made is extremely high. Thus, the time taken for making a decision of a fault occurrence from the detection of a discrepancy in the comparison can be significantly shortened.

Figure 1:
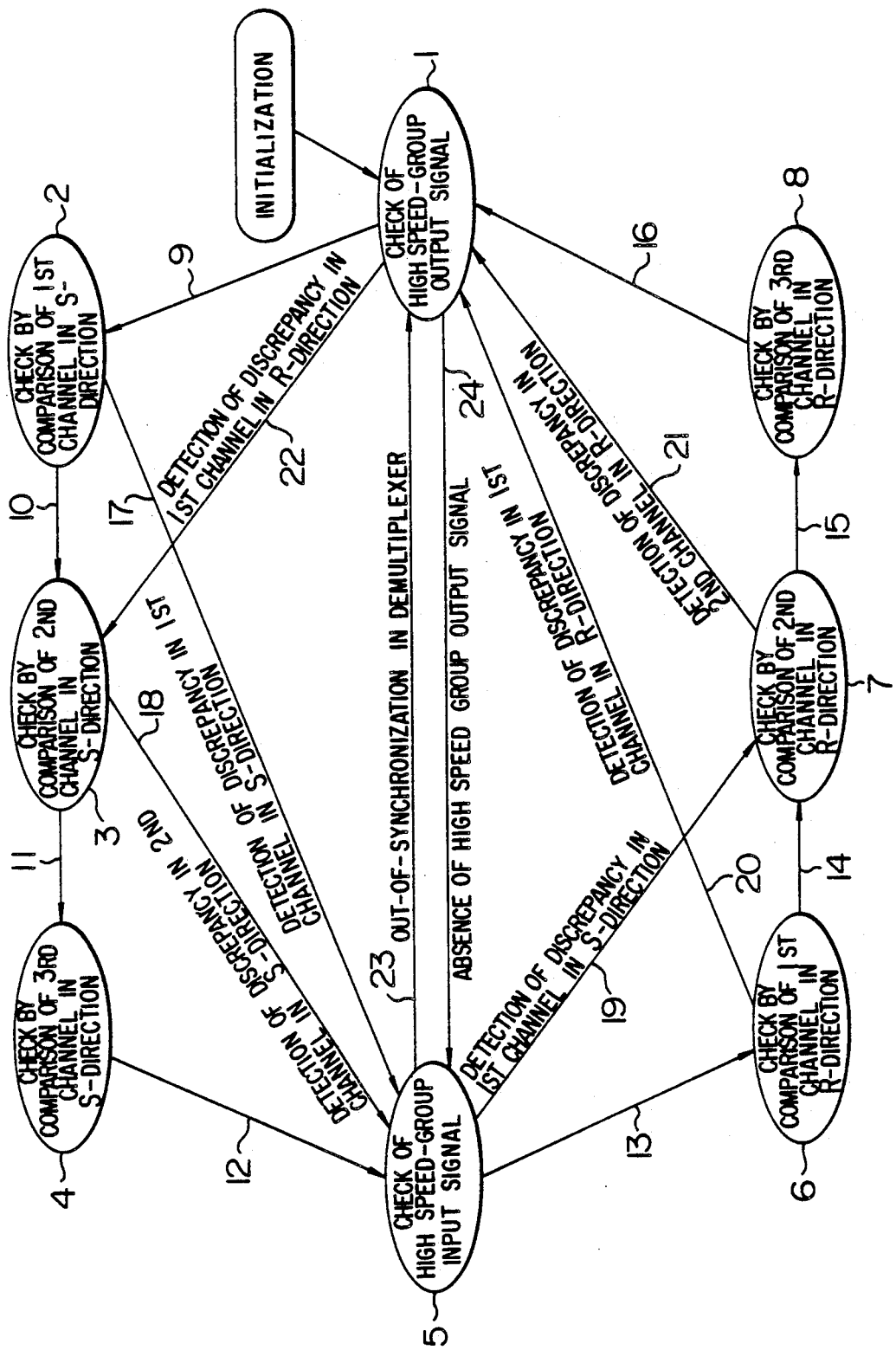
FIG. 1 is a status transition diagram for illustrating the check procedure by comparison according to an embodiment of the present invention.

In the following, an exemplary embodiment of the present invention will be described by reference to the drawings on the assumption that the multiplex equipment of concern is a four-group stack multiplex equipment: however, it is to be understood that the invention can equally be applied to other types of multiplex equipment. The four-group multiplex equipment is designed to multiplex three channels of low speed group signals into a high speed group signal and demultiplex the high speed group signal into three channels of the low speed group signal. FIG. 1 shows a status transition diagram for illustrating a process or sequence of comparisons in which the input/output signals of the multiplex equipment are collated by a monitor system for thereby diagnosing whether the multiplex equipment operates normally or abnormally. In this figure, a symbol S represents the direction in which the multiplexing is performed while the symbol R represents the direction in which the demultiplexing takes place. Further, reference numeral 1 denotes a status level at which the high speed group output signal is checked, reference numerals 2, 3 and 4 denote status levels at which first to third channels in the S-direction are checked by comparison, respectively, numeral 5 denotes a status level at which the high speed group input signal is checked, numerals 6, 7 and 8 denote status levels where the first to third channels in the R-direction are checked by comparison, respectively, and reference numerals 9 to 24 denote arrows indicating the inter-status transitions.

Upon initialization, the status 1 in which the high speed group output signal is checked is first assumed. If the output signal is absent, comparison in the S-direction is impossible. Accordingly, transition is made to the status 5 as indicated by the arrow 24. Otherwise, transition is made to the status 2 according to the arrow 9 where the first channel in the S-direction is checked by the comparison. Subsequently, the procedure proceeds through the statuses 2, 3 and 4 along the arrows 10, 11 and 12, respectively, up to the status 5, so far as the result of comparison is normal. In the status 5, it is checked whether the demultiplexing unit is in the out-of-synchronization or not, i.e. whether the high speed group input signal is normal or abnormal. If it is abnormal, this means that the check by comparison in the R-direction is impossible. Accordingly, transition is made to the check in the S-direction, as indicated by the arrow 23. On the other hand, when the high speed group input signal is normal, the check by comparison is performed starting from the first channel, as indicated by the arrow 13. Subsequently, the procedure proceeds through the statuses 6, 7 and 8 in accordance with the arrows 14, 15 and 16, respectively, so far as the result of comparison is normal. In this way, the inter-status transition described above is repeated so long as no fault occurs in the equipment.

Now, it is assumed that a fault takes place in a low speed group signal processing circuit for the first channel in the multiplexing unit. In that case, discrepancy is detected in the comparison performed at the status level 2, whereupon transition is made to the status 5 as indicated by the arrow 17, being followed by the transition to the status 7 as indicated by the arrow 19 where the second channel in the R-direction is checked by comparison. When the result of comparison is found to be normal in the status 7, this means that the monitor system is normal Accordingly, it can be decided that the discrepancy in comparison detected at the status level 2 is due to the fault in the multiplexing unit. Similarly, when fault takes place in the low speed group signal processing circuitry for the second channel in the multiplexing unit, transition is made from the status 3 to the status 6 through the status 5 along the arrows 18 and 13. At the status level 6, the first channel in the R-direction is checked by comparison. Since the result of comparison is normal, it is established that the monitor system is normal. Thus, it can be decided that the discrepancy in comparison detected at the status level 3 is due to the fault of the multiplexing unit. Occurrence of fault for the third channel in the multiplexing unit is dealt with in a similar manner.

Assuming that a fault occurs in the multiplexing unit in conjunction with the high speed group signal processing circuitry, the comparison performed at the status levels 2, 3 and 4 will all result in detection of the discrepancy. However, according to the invention, when the discrepancy of comparison is detected for the first time at the status level 2, then transition is made to the status level 5 along the arrow 17 and hence to the status level 7 along the arrow 19, where the second channel in the R-direction is checked by comparison. When the result of the comparison is normal, this again means that the monitor system is normal. Accordingly, it can be decided that the discrepancy of comparison detected at the status level 2 is due to the fault of the multiplexing unit. In the case of the hitherto known monitor system where the procedure proceeds in the sequence of 2, 10, 3, 11, 4 and 12, all the comparisons performed until that time point will result in detection of the discrepancy. Consequently, normality of the result of comparison can be detected only when the procedure has proceeded to the status 6 from the status 5, whereupon decision can be made at length that the discrepancy of comparisons performed until then is due to the fault in the multiplexing unit. Obviously, a lot of time is taken for making the decision of fault from the detection of discrepancy of comparison.

The procedure for detecting fault of the demultiplexing unit can be performed as in the case of detection of fault in the multiplexing unit described above. Accordingly, repeated description will be unnecessary.

In practical applications, it is conceivable to implement in a unified structure the low speed group signal processing circuitries of the multiplexing and demultiplexing units (e.g. implementation of logic circuits in LSI and analogue circuit in hybrid IC for each of the channels). In that case, a fault occurring, for example, in the first channel in the S-direction may undesirably exert influence to the first channel in the R-direction. In contrast, according to the present invention, when a discrepancy of comparison is detected at the status level 2, the processing procedure proceeds along the route of 17, 5 and 19, whereupon the succeeding comparison is performed for another channel (i.e. channel in the R-direction). In that case, the probability of a fault occurring simultaneously also in the second channel in duplicate is extremely low. In other words, the result of a check of the second channel in the R-direction will be normal. Thus, it can be decided that the discrepancy of comparison detected at the status level 2 is due to the fault of the equipment.

Figure 2:
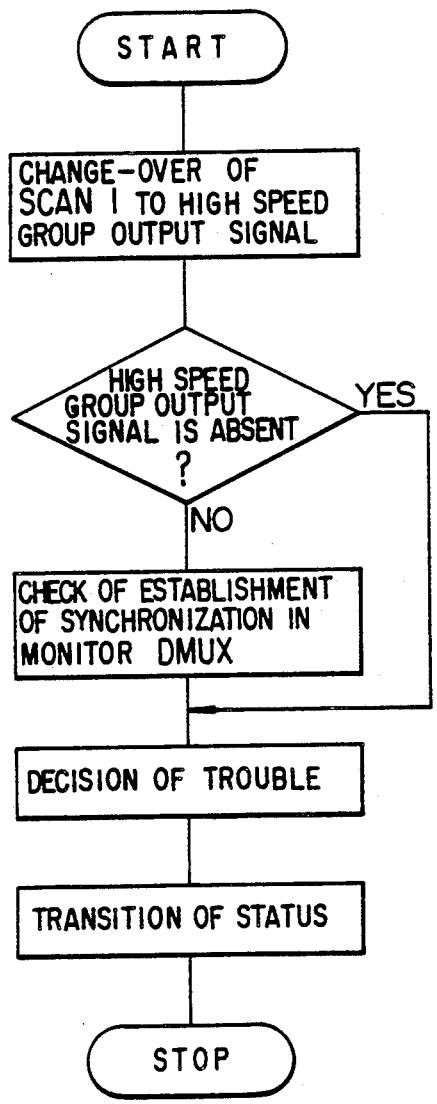
FIG. 2 is a flow chart showing a processing procedure for checking the high speed group output signal at a corresponding status level shown in FIG. 1.
Figure 3:
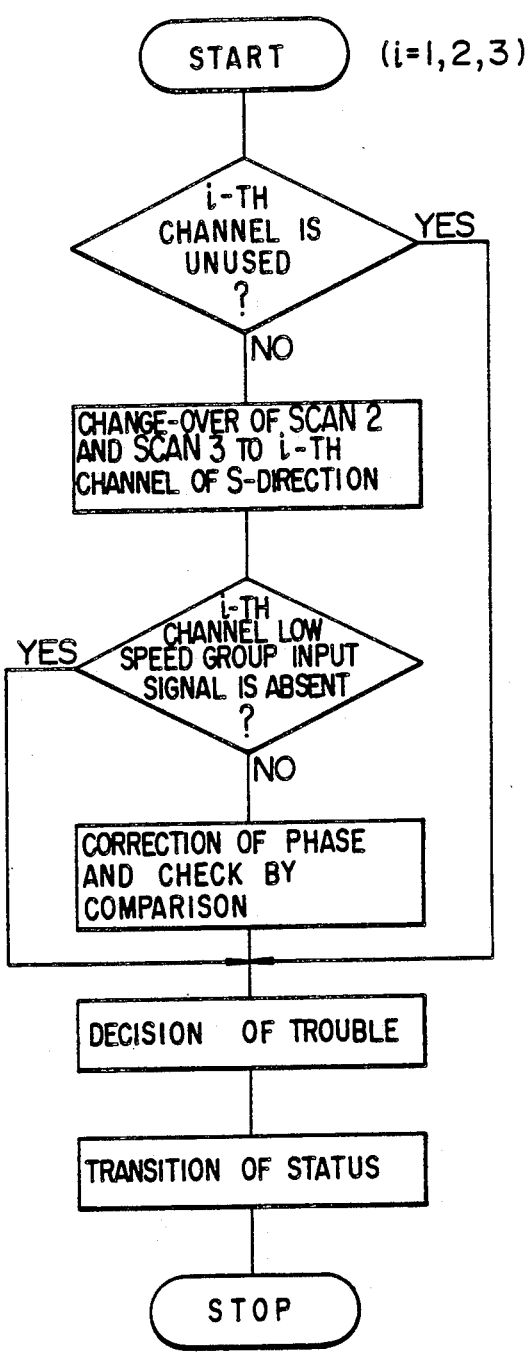
FIG. 3 is a flow chart showing a processing procedure for checking the i-th channel in S-direction at a corresponding status level shown in FIG. 1.

FIG. 2 shows in a flow chart the processing executed at the status level 1 shown in FIG. 1, FIG. 3 shows in a flow chart the processing executed at the status levels 2, 3 and 4 shown in FIG. 1, FIG. 4 shows in a flow chart the processing executed at the status level 5 shown in FIG. 1, FIG. 5 shows in a flow chart the processing executed at the status levels 6, 7 and 8 shown in FIG. 1, FIG. 6 is a status transition diagram showing the conditions for decision referred to in the course of execution of the processings for decision of fault shown in FIGS. 2 to 5, and FIG. 7 is a block diagram showing a general arrangement of a four-group stack multiplex equipment according to an embodiment of the present invention.

Figure 7:
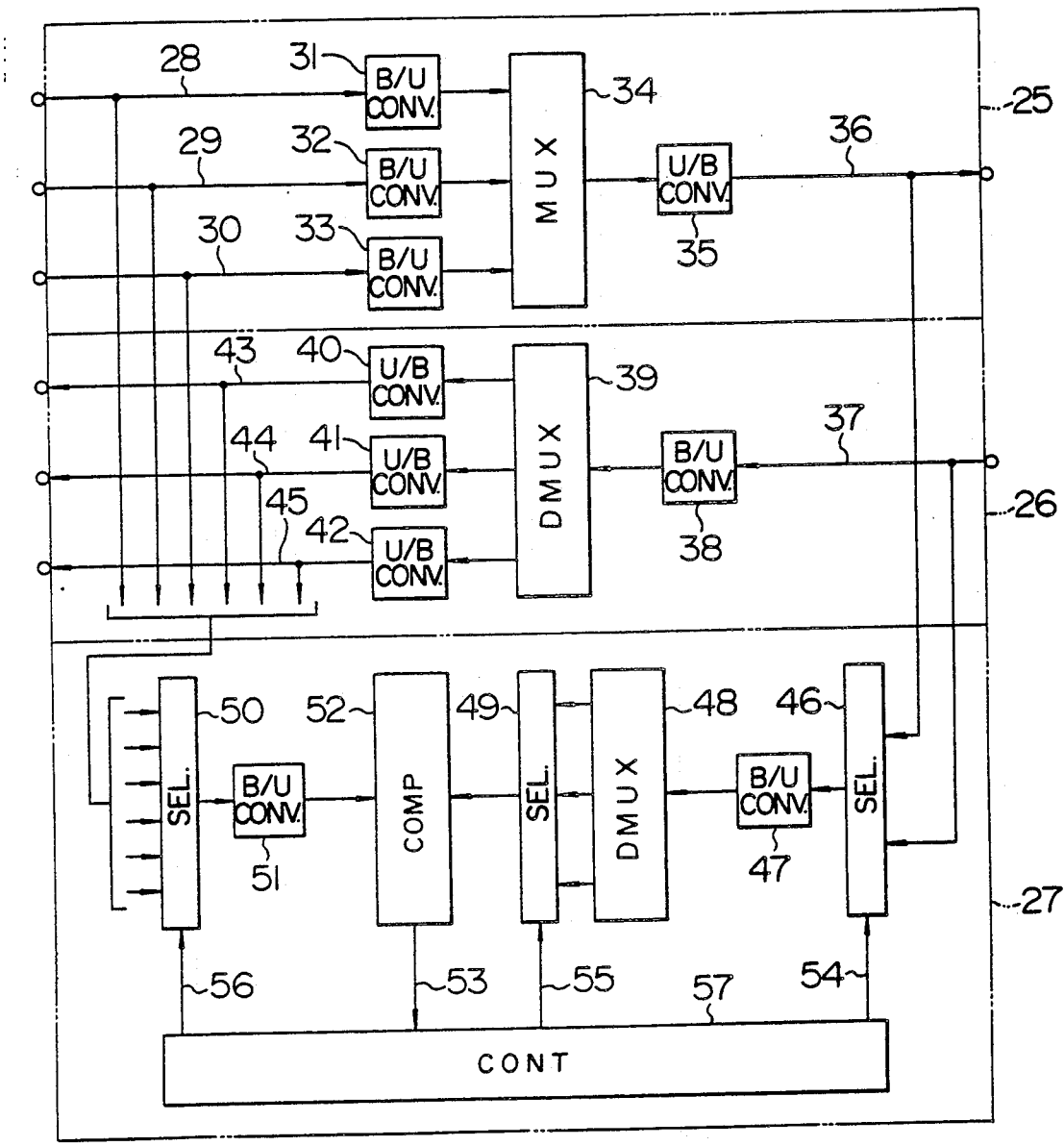
FIG. 7 is a block diagram showing a general arrangement of a four-group stack multiplex equipment according to the embodiment of the invention.

For the sake of convenience, description will first be made by reference to FIG. 7. In this figure, reference numeral 25 generally denotes a multiplexing unit, 26 generally denotes a demultiplexing unit, and 27 generally denotes a monitor system. Further, reference numerals 28 to 30 designates low speed group input signals of the first to third channels, respectively, 31 to 33 denote bipolar-to-unipolar converters (B/U converters), respectively, 34 denotes a multiplexer circuit, 35 denotes a unipolar-to-bipolar converter (U/B converter), 36 designates a high speed group output signal, 37 designates a high speed group input signal, 38 denotes a B/U converter, 39 denotes a demultiplexer circuit, 40 to 42 denote U/B converters, respectively, 43 to 45 designate low speed group output signals of the first to third channels, respectively, 46 denotes a selector (SCAN1) for selecting one of the high speed group input signal 36 and the high speed group output signal 37, 47 denotes a B/U converter, 48 denotes a demultiplexer circuit, 49 denotes a selector (SCAN 3) for selecting one of the outputs of the demultiplexer 48, a numeral 50 denotes a selector (SCAN 3) for selecting one of the low speed group input signals and the low speed group output signals of the first to third channels, respectively, 51 denotes a B/U converter, 52 denotes a comparator for comparing the output signal of the B/U converter 51 serving as a monitor signal for the low speed group circuitry with the output signal of the selector (SCAN 3) 49 serving as a monitor signal for the high speed group signal circuitry for performing the phase correction, 53 designates an output signal representative of the result of comparison performed by the comparator 52, numerals 54, and 56 designate selection command signals for commanding which signals the selectors 46, 49 and 50 should select, respectively, and finally a reference numeral 57 denotes a processing controller incorporated in the monitor system 27.

In the following, operation of the processing controller 27 will be described by reference to FIGS. 2 to 6 showing processing flows in combination with the status transition diagram shown in FIG. 1.

At first, at the status level 1 shown in FIG. 1, the high speed group output signal is selected by the selector (SCAN 1) 46 in accordance with the selection command signal 54 issued by the processing controller 57, whereupon decision is made as to whether the selected high speed group output signal is normal or not on the basis of a signal absence detection information outputted from the U/B converter 35, as is illustrated in the processing flow chart of FIG. 2. When the selected high speed group output signal 36 is normal, it is checked if synchronization has been established or not on the basis of synchronization information supplied from the demultiplexer (DMUX) circuit 48. In case the high speed group output signal is absent, decision is made that the system or equipment suffers fault or trouble. On the other hand, when the information of synchronization available from the, demultiplexer circuit 48 indicates an out-of-synchronization condition notwithstanding the presence of the high speed group output signal, it is decided that the monitor 27 suffers a fault. Further, when the synchronization is established, transition of status is made for initiating the check by comparison starting from the first channel. For checking by comparison the first channel at the status level 2 shown in FIG. 1, the processing procedure shown in FIG. 3 is executed by setting i="1". At first, it is checked whether the first channel is an unused channel. If it is unused, no comparison is performed, whereupon the processing jumps to the fault deciding step. However, since the i-th channel is unused, no decision about the fault is made for this channel, whereupon transition is made to the processing for the second channel. On the other hand, when the i-th channel is used, the first channel is selected by the selector 49 (SCAN 3) while the low speed group input signal of the first channel is selected by the selector 50 (SCAN 2), whereupon decision is made as to whether the low speed group input signal is absent or not on the basis of the signal absence information supplied to the controller 57 from the B/U converter 31. In case the low speed group input signal of concern is absent, this means that comparison is impossible. Accordingly, in the fault decision processing, the result of the check of the first channel in the S-direction is put aside from the comparison with the conditions for the decision of fault, whereupon transition is made to the succeeding status where the second channel in the S-direction is checked. On the other hand, when the low speed group input signal of concern is present, the comparison is performed for a predetermined period (e.g. 100 msec) to check whether discrepancy is present or not. The decision for fault is executed in accordance with the procedure illustrated in FIG. 6, which is then followed by the inter-status transition, as shown in FIG. 1. The check and comparison for the second and third channels are performed in a similar manner.

Check of the demultiplexing unit 26 is started from the status 5 shown in FIG. 1. A processing flow to this end is illustrated in FIG. 4. Since the content of the processing is similar to that shown in FIG. 2, repeated description will be unnecessary. It should however be added that the information of establishment of synchronization in the demultiplexer circuit 50 of the demultiplexing unit 27 used in the processing shown in FIG. 4 is supplied to the processing controller 57 from the demultiplexer circuit 39.

Comparison and check of the first to third channel in the R-direction is performed in accordance with the procedure illustrated in FIG. 5. Since the content of the processing is similar to that shown in FIG. 3, repeated description will be unnecessary, being understood that the i-th channel output signal absence information is supplied to the controller 57 from the U/B converters 40 to 42.

FIG. 6 shows a status diagram representing the fault decision processings described above by reference to FIGS. 2 to 5. Since the content of the processing is previously described, repeated description is omitted. It is however to be mentioned that the signal absence information is supplied to the controller 57 from the B/U converters 31 to 33, the U/B converters 35 and 40 to 42 while the synchronization establishment information is supplied to the controller 57 from the demultiplexer circuits 39 and 48, although they are not shown in FIG. 7 for simplification of illustration.

It will be appreciated from the above description that the illustrated embodiment brings about such advantageous effect that the time taken for deciding the occurrence of trouble or fault in the system (equipment) after detection of discrepancy in the comparison can be significantly shortened.

As will now be appreciated from the foregoing description, when the multiplex equipment is diagnosed by the monitor by comparing the input and output signals thereof, the time taken for deciding the occurrence of fault or trouble in the equipment from the detection of discrepancy in the comparison can be considerably reduced according to the teachings of the present invention. Thus, when the equipment suffering from the fault is to be exchanged with a reserve or spare equipment, inoperative duration involved in the exchange can be shortened to allow rapid restoration.

We claim:

1. A method of monitoring a multiplex equipment which includes a multiplexing unit for multiplexing low speed group input signals of plural channels into a high speed group output signal and a demultiplexing unit for demultiplexing a high speed group input signal into low speed group output signals of plural channels, wherein said high speed group output signal and said low speed group input signals and said high speed group input signal and said low speed group output signals are monitored through comparison on the basis of the low speed group signal, comprising:

(a) a step of performing comparison of said high speed group output signal and said low speed group input signals in accordance with the order of the channel sequence of the low speed group signals and subsequently performing comparison of said high speed group input signal and said low speed group output signals in accordance with the order of the channel sequence of said low speed group signals, said step being repeated until discrepancy is detected from said comparison;

(b) a step in which, when discrepancy between said high speed group output signal and a low speed group input signal is first detected in a given one of the signal channels of said low speed group signals, step (a) is discontinued and comparison is then performed between the high speed group input signal and the low speed group output signal in another channel differing from said given one channel of the low speed group signals, said comparison being subsequently performed in said order of comparison; and (c) a step in which, when discrepancy is first detected between the high speed group input signal and the low speed group output signal in a certain channel of the low speed group signals, step (a) is discontinued and comparison is then performed between the high speed group output signal and the low speed group input signal in another channel differing from said certain channel, said comparison being performed in accordance with said order of comparison.

2. A monitor system for a multiplex equipment, comprising a multiplexing unit for multiplexing low speed group input signals of plural channels into a high speed group output signal; a demultiplexing unit for demultiplexing a high speed group input signal into low speed group output signals of plural channels; means for monitoring said high speed group output signal and said low speed group input signals and for monitoring said high speed group input signal and said low speed group output signals through comparison on the basis of the low speed group signals in a predetermined sequence; and control means, responsive to a discrepancy being detected in the comparison between the high speed group output signal and the low speed input signal in a certain channel of the low speed group signals in the course of monitoring the multiplexing unit, for immediately discontinuing said predetermined sequence and effecting a comparison between the high speed group input signal and the low speed group output signal in a different channel of the low speed group signal than that in which said discrepancy was detected for monitoring the demultiplexing unit.

* * * * *